J. F. ANDREWS.
Pipe Couplings.

No. 117,960.    Patented August 15, 1871.

Witnesses:
P. C. Dieterich
Francis McArdle

Inventor:
J. F. Andrews
per [signature]
Attorneys.

117,960

UNITED STATES PATENT OFFICE.

JOSEPH F. ANDREWS, OF NASHUA, NEW HAMPSHIRE.

IMPROVEMENT IN PIPE-COUPLINGS.

Specification forming part of Letters Patent No. 117,960, dated August 15, 1871.

*To all whom it may concern:*

Be it known that I, JOSEPH F. ANDREWS, of Nashua, in the county of Hillsborough and State of New Hampshire, have invented a new and useful Improvement in Pipe-Joint; and I do hereby declare that the following is a full, clear, and exact description thereof, which will enable others skilled in the art to make and use the same, reference being had to the accompanying drawing forming part of this specification.

The object of this invention is to simplify and facilitate the operation of making joints in pipes and to render the joint more perfect for conducting water and other liquids, steam, or gas; and it consists in a tongue and groove in the ends of the pipes arranged as hereinafter described.

Figure 1:
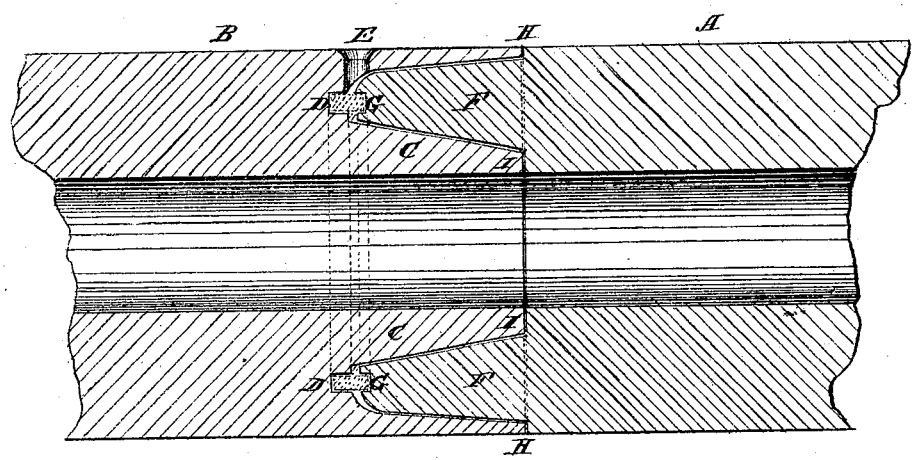
Figure 2:
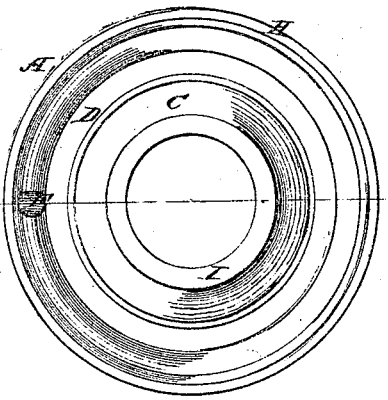
Figure 3:
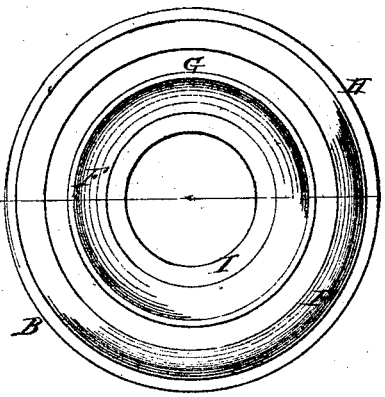

In the accompanying drawing, Figure 1 represents a longitudinal section, showing two pipes connected according to my invention, the section being taken on the line $xx$ of Figs. 2 and 3. Fig. 2 is an end view of the female pipe, and Fig. 3 is an end view of the male pipe.

Similar letters of reference indicate corresponding parts.

A is the male, and B the female pipe. C represents a groove in the female pipe of a depth and proportion corresponding with the diameter of the pipe. In the bottom of the groove C, which is somewhat funnel-shaped, as seen in the drawing, is a small recess, D. E is an orifice through the pipe B connecting with the groove C and with the recess E, through which the cement, molten lead, or other fluid substance is poured for making the joint tight. F is a tongue on the end of the male pipe A, of a shape and size to fit the groove in the pipe B. In the end of the tongue is a recess, G, which corresponds in size and position with the recess D in the other pipe. The two recesses form a receiving-chamber for the liquid cement, metal, or other material, which is poured into the joint, and from which such cement, &c., is distributed throughout the joint. H represents an outer shoulder around the pipe A, and I is an inner shoulder next the bore J of the pipe. The extreme end of the pipe B comes in contact with these shoulders when the ends are placed square together, as seen in the drawing. The form of the tongue and groove in the end of the pipes may be varied to suit circumstances. The cement or filling has so large a surface to adhere to that the pipes may be placed on a curve or other position, in which case the shoulder-joints above referred to would be separated except at one point.

This improvement applies to metallic as well as to cement pipe, and the advantages of this mode of forming the joints of pipes for conducting water, gas, &c., under ground are many and obvious.

Having thus described my invention, I claim as new and desire to secure by Letters Patent—

The groove C, the tongue F, the recesses D and G, and the orifice E, in forming a joint in pipes, substantially as shown and described.

JOSEPH F. ANDREWS.

Witnesses:
GEO. SWAIN,
JAMES F. WHITMARSH.